H. Heinemann.
Button.

N° 8205.  Patented Jul. 8 1851

Witnesses.
W^m Serrell
Lemuel W. Serrell

Inventor
H. Heinemann

UNITED STATES PATENT OFFICE.

H. HEINEMANN, OF NEW YORK, N. Y.

SILK-COVERED BUTTON.

Specification of Letters Patent No. 8,205, dated July 8, 1851.

*To all whom it may concern:*

Be it known that I, HIRSCH HEINEMANN, of the city, county, and State of New York, manufacturer of silk goods, have invented, made, and applied to use a certain new and useful Improvement in the Construction of Ornamental Silk-Covered Buttons, for which I seek Letters Patent of the United States; and I do hereby declare that the following is a full, clear, and exact description of the same, reference being had to the annexed drawing, making part of this specification, in which—

Figure 1:
Figure 2:
Figure 3:

Figure 1 is a sectional elevation, Fig. 2 is a side elevation and Fig. 3 is a plan of the top of my improvement, as applied to an ornamental drop button.

In these $a$, is the mold or form, over which a covering of silk is stretched or formed, and through the mold $a$, is a hole 1, that receives the ends of the silk covering. This so far is made in the ordinary manner, but the mode of attachment heretofore has been by a cord secured in the hole 1, and sewed to the garment to which it is to be attached, but this mode of securing is not permanent, neither are the ends of the silk covering in the hole 1, covered up, so as to make a neat, handsome button. I therefore insert through the hole 1, in the mold when covered a split shank 2, with a small ornamental plate 3, on its outer end and place a small ornamental washer 4, over the end of the button on the split shank 2, and by means of a pointed instrument open the split shank 2, which holds the washer on, securing the covered mold $a$, between the plate 3, and washer 4, and the eye thus formed in the split shank 2, serves to attach the button to the garment in any usual manner. The plate 3, and washer 4, thus cover up the ends of the silk covering, making a neat, tasty, and handsome button, that is strong and durable.

I do not mean to limit myself to the shape of the mold nor to the pattern or color formed on the silk covering; neither do I claim to be the first who has used the split shank, plate and washer as that has been used with a glass bead for ornamental purposes; but I do not know of any one who has used this plate, shank, and washer, as a means for fastening a silk covered button, and at the same time secure and hide the ends of the silk cover, in the hole of the mold, thereby making a durable, finished and handsome ornamental button.

Therefore what I claim is—

The application of the plate, shank and washer, to a silk covered button, for the purposes specified and as described and shown.

In witness whereof I have hereunto set my signature this seventeenth day of March one thousand eight hundred and fifty-one.

H. HEINEMANN.

Witnesses:
W. TERRELL,
LEMUEL W. TERRELL.